W. A. TURBAYNE & T. R. DU BOIS.
DYNAMO ELECTRIC MACHINE.
APPLICATION FILED MAY 19, 1915.

1,276,594.

Patented Aug. 20, 1918.
3 SHEETS—SHEET 1.

Witnesses
L. W. Corbett
B. H. Caldwell

Inventors
William A. Turbayne
and Thomas R. Du Bois

By Raymond H. Van Nest
Attorney

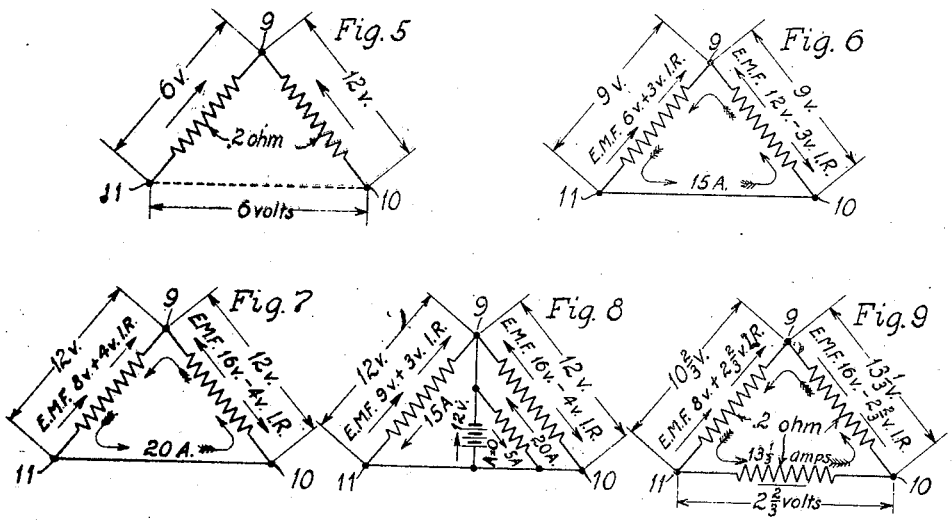
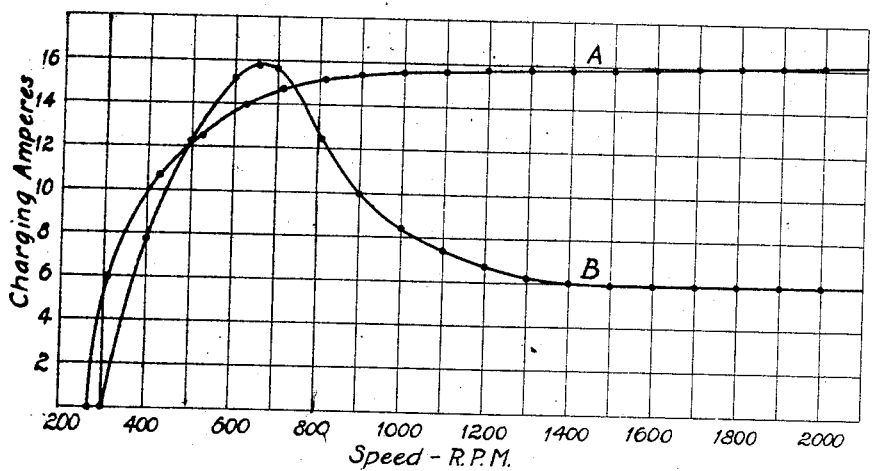

UNITED STATES PATENT OFFICE.

WILLIAM A. TURBAYNE AND THOMAS R. DU BOIS, OF NIAGARA FALLS, NEW YORK, ASSIGNORS TO U. S. LIGHT & HEAT CORPORATION, OF NIAGARA FALLS, NEW YORK, A CORPORATION OF NEW YORK.

DYNAMO-ELECTRIC MACHINE.

1,276,594.   Specification of Letters Patent.   Patented Aug. 20, 1918.

Application filed May 19, 1915. Serial No. 29,067.

*To all whom it may concern:*

Be it known that we, WILLIAM A. TURBAYNE and THOMAS R. DU BOIS, citizens of the United States, residing at Niagara Falls, in the county of Niagara and State of New York, have invented new and useful Improvements in Dynamo-Electric Machines, of which the following is a specification.

This invention relates to dynamo-electric machines. It is particularly applicable to a dynamo-electric machine which is adapted to be employed in an automobile starting and lighting system, and which serves as a motor to start the engine and then as a generator to furnish current to charge a storage battery and light lamps.

The invention will be explained by reference to a dynamo electric machine which has its armature directly connected to the engine shaft to serve as a flywheel, but it will be understood that it may be embodied in various other dynamo-electric machines.

For convenience, the dynamo-electric machine will hereafter be designated either a motor or a generator, according to the functions it performs under the conditions that obtain at the time.

A storage battery furnishes the current to run the motor. It also furnishes current to operate the lamps when the generator is inactive. To start the engine a starting switch is closed to supply current from the battery to the motor. Then the starting switch is opened and the motor becomes a generator, it being driven by the engine, and when it attains sufficient speed to develop a predetermined voltage, an automatic switch closes through which current is supplied to charge the battery and light the lamps.

The present invention is a modification of the invention described and claimed in the co-pending application of Lewis W. Nelson, Serial No. 856,805, filed August 14, 1914. It embodies the principles and many of the details of construction and electrical arrangement fully described in said co-pending application. In addition, however, it employs a modified arrangement of windings and electrical connections whereby different results are obtainable.

An object of the present invention is to provide a generator of increased efficiency and range.

Another object of the invention is to provide a generator which will inherently produce a reducing output as the speed increases.

Another object is to provide a generator which will inherently produce a high charging rate for the battery at low generator speeds and a low charging rate at high generator speeds.

Another object is to produce a generator which has an inherent output characteristic which may be predetermined to provide varying currents for charging the battery under varying conditions.

In the embodiment of the invention as disclosed in the Nelson application, the dynamo-electric machine, as a generator, has a field winding and an armature winding. The field winding produces the field flux. The armature winding produces a magneto motive force which, according to varying electrical conditions, assists or opposes the magneto motive force set up by the field winding. The effect of this magneto motive force in the armature is to so control the resultant field strength as to maintain the voltage across the generator brushes of the machine at such a value that the battery charging current is held within close limits, notwithstanding wide variations in speed. Only a relatively small portion of the armature winding in the machine is employed in generating to produce the desired output control. The armature current which produces this resultant flux is that current which circulates in the comparatively small armature section between two negative brushes connected by a conductor of negligible resistance. With the modified arrangement of the present invention, advantage is taken of the current that flows between these two negative brushes to control the output characteristic of the machine to obtain improved and more efficient results.

To this end, current derived from these negative brushes is permitted to pass around additional field windings of the machine so as to control the output characteristic as desired.

When the dynamo-electric machine is to be used as a starter, it produces a high torque as a motor, and provision is made, as above explained, to give the desired characteristic to the current produced when it operates as a generator.

A dynamo-electric machine embodying this invention will now be described in detail.

The views of the drawings are as follows:

Figs. 5 to 9 illustrate diagrammatically current directions and values under various conditions.

Fig. 10 illustrates by curves the battery charging current at various speeds.

Figure 1:
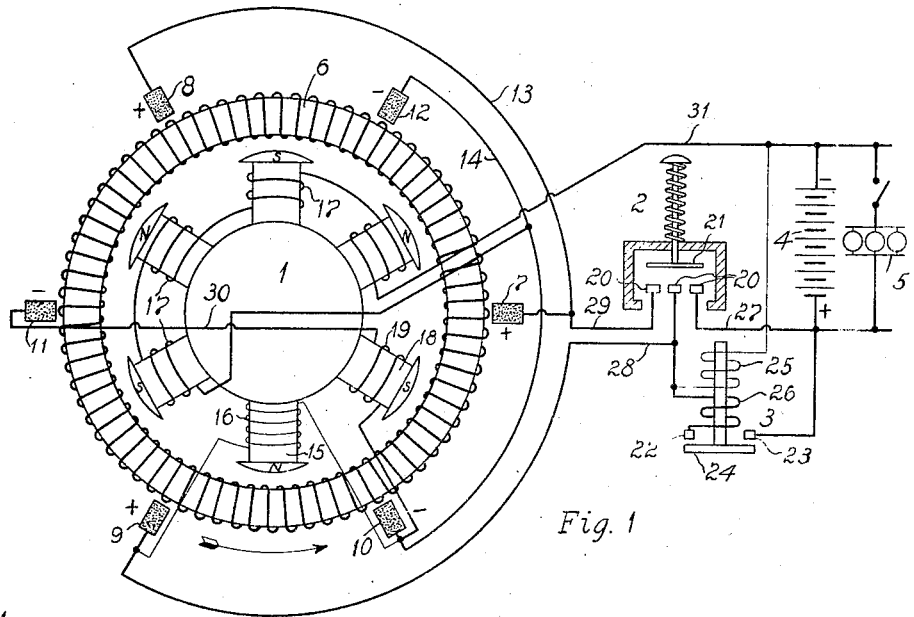
Figure 1 is a diagram of an automobile starting and lighting system.

The starting and lighting system has a dynamo-electric machine 1, a starting switch 2, an automatic switch 3, a storage battery 4, and lamps or other translating devices 5.

The dynamo-electric machine has a Gramme ring armature 6, which is carried by the engine shaft to serve as a fly-wheel. Three positive brushes 7, 8 and 9 and three negative brushes 10, 11 and 12 are employed. The positive brushes 7 and 8 are electrically connected together by a bus ring or conductor 13. The remaining positive brush 9 is not connected to the conductor 13. The negative brushes 10 and 12 are connected together by a bus ring or conductor 14. The negative brush 11 is not connected to the conductor 14, but is connected to the negative brush 10 through the auxiliary field windings of the machine, as hereinafter explained.

The field has six poles. One pole 15 is provided with a shunt winding 16. Four of the remaining poles are provided with series windings 17, while the sixth pole 18 is provided with a winding 19 connected between the negative brushes 10 and 11. As illustrated in Fig. 1, this pole is the one adjacent the shunt wound pole in the direction of rotation of the armature. Obviously, the machine may have eight poles, as illustrated in said Nelson application, or any other suitable number, as desired. When the number is increased, the number of series wound poles in increased, while the shunt wound pole and the pole with the winding connected between the negative brushes remain the same.

The starting switch has three contacts 20, adapted to be connected together by a bridging contact 21. The contacts 20 are connected respectively to the bus ring or conductor 13, the positive brush 9 and the positive battery terminal.

The automatic switch 3 is connected between the generator and battery. It has a pair of contacts 22, 23 and a bridging contact 24. The bridging contact is operated electro-magnetically by a lifting coil 25, connected across the generator terminals and a holding coil 26, connected in series between the generator and battery when the switch closes. The lifting coil closes the switch when the generator voltage substantially equals the battery voltage and the holding coil assists to keep the switch closed. When the voltage of the generator falls below the battery voltage, the battery discharges through the holding coil. This reverses the polarity of the holding coil so that it opposes the lifting coil and causes the switch to open.

When the engine is at rest, the automatic switch and starting switch are open, as illlustrated.

When the starting switch is closed, the contacts 20 are connected together. Current then flows from the battery through conductor 27 to the switch contact 20 and bridging contact 21, where it divides, a portion flowing by conductor 28 to the positive brush 9 and the remainder flowing by the conductor 29 to the bus conductor 13 and the positive brushes 7 and 8. This current flows through the armature to the negative brushes. That portion returning through the negative brush 11, flows through conductor 30 and field winding 19 on pole 18, to the brush 10, where it joins current from brushes 10 and 12 and passes through the series field windings 17 and conductor 31, back to the battery. The shunt field winding 16 is also energized by current flowing from brush 9 to brush 10.

In explaining the operation of the generator, the machine will first be described as it operates in said Nelson application and then it will be pointed out specifically wherein the present invention is a modification.

The diagrams in Figs. 5 to 9, illustrate circuit conditions. The plain arrows indicate the direction of electro-motive force and the feathered arrows indicate the direction of current. The three points of the triangle designated 9, 10 and 11, represent the three brushes similarly designated on Figs. 1 and 3.

In considering these diagrams, reference will be made to the well known Kirchoff laws, that at any point in a circuit the sum of the currents flowing to that point is equal to the sum of the currents flowing away from it, and that in any closed circuit or net-work, the algebraic sum of the product of current and resistance is equal to the sum of the electro-motive forces. Therefore, it follows that the algebraic sum of the electro-motive forces in a closed circuit equals zero. Also it is understood that the electromotive forces developed by a current flowing through a resistance is a counter electromotive force which opposes the electromotive force which causes current to flow.

Referring now to Fig. 5, it may be assumed that the north pole 15 carrying the magnetizing winding 16 is excited from a separate source, and that the external circuits leading from the brushes 9, 10 and 11 are open. The flux emanating from the north pole 15 will divide in the armature core, part returning through the south pole on the left hand and an equal amount returning through the south pole on the right, since the reluctance over all of the poles is uniform. These south poles are therefore consequent poles. When the armature is rotating, electro-motive forces will be developed in the armature. The electro-motive force developed in the armature winding between brushes 9 and 10 will be double the electro-motive force developed in the winding between the brushes 9 and 11, since twice the amount of flux flows from pole 15 as returns through either one of the adjacent poles 18. At a certain definite speed, therefore, the condition illustrated by Fig. 5 will exist. It is assumed in this figure that the brushes 10 and 11 are not connected. If the speed be such that 12 volts are induced in the winding which terminates in brushes 9 and 10, then 6 volts will be developed in the winding terminating in brushes 9 and 11. If now the brushes 10 and 11 be connected by the conductor 30, assumed to be a continuous conductor having a negligible resistance, current will flow around the circuit thus completed, as indicated in Fig. 6. It is assumed that the armature windings between each pair of brushes have a resistance of $\frac{2}{10}$ ohms, so that neglecting the effects of the armature current on the flux, the six volts available would cause a current of 15 amperes to circulate in the armature windings, since these windings together have a resistance of $\frac{4}{10}$ ohms. This current of 15 amperes will develop a voltage drop of 6 volts or 3 volts in either half of the armature winding. The right hand half of the armature winding terminating in brushes 9 and 10, is the predominating source of electromotive force, and therefore, voltage due to the resistance drop in this section will be in opposition to the induced voltage, while in the left hand winding, the voltage due to the resistance drop will be added to the induced voltage. Therefore, the voltage across brushes 9 and 10 or 9 and 11 will, under these conditions, be 9 volts. The current flows from brush 10 through the armature winding and leaves by brush 11, which we assume for the present, is connected to brush 10 by a conductor 30 having practically zero resistance, and this current, therefore, exerts a magnetizing effect, tending to direct the flux to the left. Thus, the current through the armature winding exerts a magnetizing force in a direction tending to cause the magnetic flux to flow through the north pole 15 and the left hand south pole and tends to divert flux from the right hand south pole. The relative turns in this machine are such that the ampere turns, due to the current flowing through the armature winding greatly exceed in value the ampere turns initially produced by the shunt winding 16 around the pole 15.

Since the brushes 10 and 11 are, by assumption, directly connected, the effective voltage developed across the brushes will be a function of the magnetic flux which is produced by the joint action of the shunt winding on the pole 15 and the current traversing the armature winding in the direction flowing from brush 10 to brush 11. It follows from Kirchoff's laws that the electro-motive force effective across the brushes 9 and 11 at any instant must exactly equal the opposing electro-motive force across the brushes 9 and 10. The electromotive force across either pair of brushes is necessarily the algebraic sum of the induced electro-motive force and the electromotive force due to the resistance drop. At any instant, therefore, the current circulating in these windings will have a value sufficient to develop a voltage drop which, when added to or subtracted from the voltage induced in either winding, will bring about the necessary equalization of voltages.

From Fig. 6 it will be apparent that in order to develop a generator voltage equaling that of a 12 volt battery, the speed of the generator must be increased sufficiently to raise the circulating current, and therefore, the developed voltage $33\frac{1}{3}$ per cent. higher than the value shown in the figure. In other words, to obtain 12 volts across brushes 9 and 10, 20 amperes must circulate in the armature and 16 volts must be induced in the winding terminating in brushes 9 and 10. These 16 volts will be opposed by the internal drop of 4 volts, due to the 20 amperes flowing through the windings, so that the effective 12 volts will be obtained across the brushes 9 and 10. This condition is represented in Fig. 7.

Fig. 8 indicates the conditions existing in the circuit at the instant that the effective voltage across the brushes exactly equals that across the battery and the automatic switch closes. Both the battery and the shunt field winding 16 are directly connected across the positive brush 9 and negative brushes 10 and 11. Brushes 10 and 11 being electrically connected by the conductor 30, may be considered as common. As the voltage across the brushes exactly equals and opposes that of the battery, no current will flow through the battery at this time, although with these 12 volts across the brushes, 20 amperes are flowing in the right hand armature winding, 5 amperes of which are furnished to the shunt field, while 15 amperes flow in the left hand winding.

After the automatic switch closes and connects the battery across the generator brushes, the battery becomes the controlling factor. Since its voltage is practically constant, the effective voltage at the brushes cannot exceed the 12 volts across the battery terminals, notwithstanding variations in speed of the armature. The current delivered by the armature will, of course, increase with variations in speed and the voltage induced in the armature winding will increase, but this increase of induced voltage will be counteracted by the increased voltage due to the resistance drop, so that the algebraic sum of the voltages effective across the brushes will, at all times, represent the battery voltage. For the purpose of explaining the theory of operation, it is assumed that the battery voltage remains constant at 12 volts, and that the internal resistance of the battery and that of the conductors leading thereto, are negligible. This assumption is reasonable, since the resistance of the battery and its connections, when compared with the internal resistance of the armature windings in this machine, is actually a negligible quantity.

Since, therefore, as above explained, the voltage across brushes 9 and 10 and 9 and 11 cannot, with speed increases, exceed the 12 volts existing across the battery, it remains to consider what changes are effected in circuit conditions when the speed rises above the critical speed, at which point the battery voltage and the voltage across the brushes are just equal. It is obvious that increase of speed must be accompanied by an increase of voltage induced within the armature winding, but the circulating current flowing through the armature winding in the direction from brush 10 to brush 11 cannot increase, as otherwise the sum of the induced voltage and the drop due to the increased current through these windings would exceed 12 volts, which, as already explained, is an impossibility. Also the voltage existing across brushes 9 and 10 cannot possibly exceed that existing across brushes 9 and 11, since the brushes 10 and 11 are directly connected by a conductor of negligible resistance, the current in the armature winding between brushes 9 and 11 cannot possibly increase, as in this section of the winding the induced electro-motive force and the electro-motive force due to the voltage drop are added together, and therefore, if the current in this section should increase, the voltage across the brushes 9 and 11 would exceed 12 volts, which is an impossibility. The only possible result, therefore, of an increase in armature speed is to cause the left hand armature section to supply current to the external circuit. Due to the relative number of field and armature turns which this machine has, the armature conductors exert a magnetizing effect almost four times as great as that imparted by the shunt winding 16. Therefore, a slight reduction in armature current under the conditions illustrated in Fig. 8, greatly influences the value of the effective flux which produces the electro-motive force. The reduction in voltage, due to the reduced current in the armature when the automatic switch closes, is such that the current in the left hand section between brushes 9 and 11 rapidly drops to zero upon a slight increase in speed.

It may be demonstrated that upon increase in speed above the critical speed, the current circulating in the armature winding between brushes 10 and 11 brings about such a decided reduction in the effective flux that the electro-motive force induced in the right hand half of the armature actually decreases in value. Furthermore, as the speed continues to increase, the electro-motive force induced in the left hand armature winding will increase until it equals the battery voltage, and finally the left hand section becomes the predominating source of electro-motive force, and this section performs the functions of a generator and supplies the external circuit. This, of course, necessitates that the current through this left hand armature winding, and therefore, its magneto motive force, reverses in direction, while the current from the right hand section decreases in value. The magneto motive force, therefore, of the left hand armature section, will be in direct opposition to the magneto-motive force due to the shunt winding 16 of the field and this, combined with the reduction in magneto motive force, due to the falling off of current in the right hand section, causes a still further reduction in effective flux as the speed increases.

Heretofore, we have assumed brushes 10 and 11 as connected by a conductor of negligible resistance. Fig. 9 illustrates the result that would be obtained by inserting in this conductor a resistance equal to the resistance of one section of the armature winding; that is, $\frac{2}{10}$ ohms. With the same rate of speed as in Fig. 8, with 16 volts induced in the right hand half of the armature and 8 volts induced in the left half, the addition of $\frac{2}{10}$ ohms resistance between brushes 10 and 11 reduces the circulating current to $13\frac{1}{3}$ amperes, reduces the internal voltage drop in each half of the armature winding to $2\frac{2}{3}$ volts and gives, therefore, an effective voltage across brushes 9 and 10 of $13\frac{1}{3}$ volts. This diagram demonstrates that the substation of a resistance for the conductor 30 results in a decrease in the circulating current and, at the same time, results in a tendency to increase the terminal voltage. With the brushes of the machine connected across a 12 volt battery, however, the terminal voltage will not increase, but the result will be that the machine will develop the 12 volts necessary to supply the external circuit at a much lower speed than when the brushes 10 and 11 were connected by a conductor of negligible resistance. This results in an increase in efficiency and range of operation.

Figure 3:
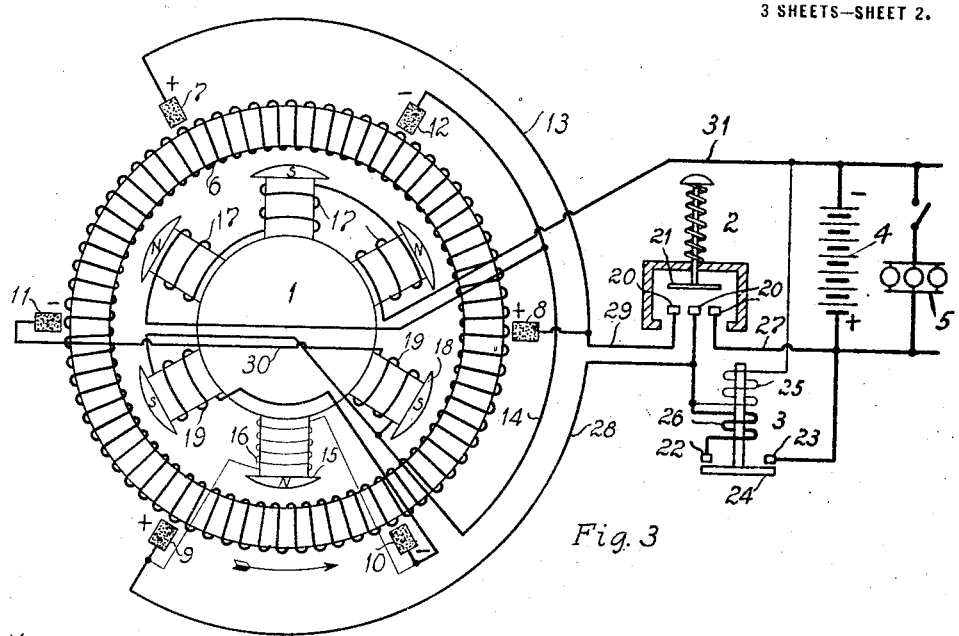
Fig. 3 is a diagram of a modified arrangement.
Figure 4:
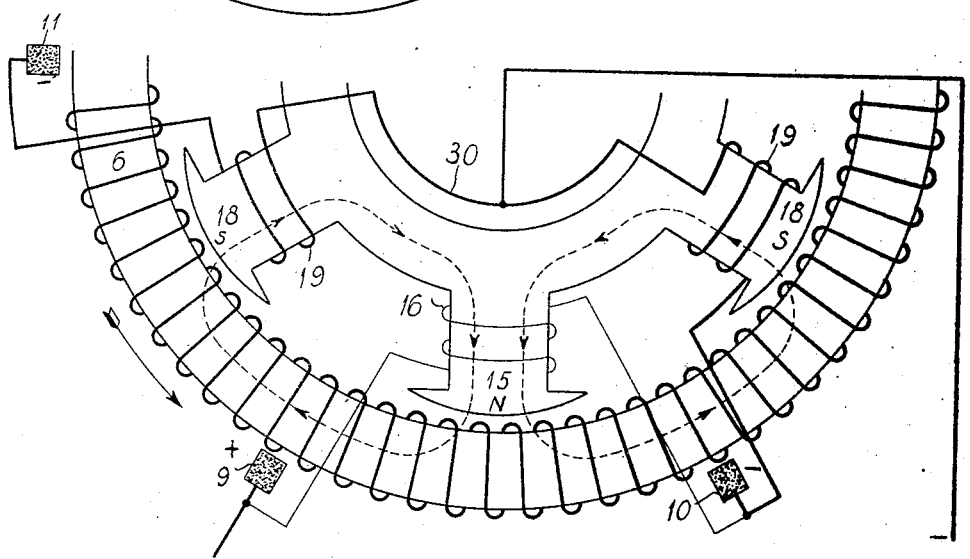
Fig. 4 is a simplified diagram of the active generator portion of the modified machine shown in Fig. 3.

Instead, however, of connecting brushes 10 and 11 through a resistance, advantage may be taken of the current flowing between these brushes. Thus, on Figs. 1 and 2, the current between these brushes is passed around a winding 19 on the field pole 18, adjacent the shunt pole 15 in the direction of rotation of the armature. In Figs. 3 and 4 the current between these brushes is passed around windings 19 on the field pole adjacent the shunt wound pole on both sides. The action of these arrangements are electrically and magnetically equivalent.

Characteristic curves illustrating the current output obtainable with this modified arrangement are illustrated in Fig. 10. Curve A illustrates a battery charging current which rises rapidly during low armature speeds but which is substantially constant above a certain critical speed. Curve B illustrates a charging current which rises rapidly at low speeds and then very materially reduces at the higher speeds. A charging current of this nature is especially desirable, as it gives a high charging rate at low speeds such as generally employed in city driving when it is reasonable to expect frequent discharges from the battery in cranking the engine, while at the high speeds which are common on long trips or tours, the charging rate is materially reduced, so as to avoid injury to the battery.

Other characteristics may be given to the output curves by varying the value of the auxiliary windings.

The operation of these modifications will now be described.

It has been pointed out herein that in the Nelson system, by reason of the fact that the right hand half of the armature winding is subjected to a greater flux than the left hand half, a heavy current circulates through the armature winding in a direction from brush 10 to brush 11. This results in a strong magnetizing force, exceeding in fact, the magnetizing force of the initial shunt winding and tending therefore, to direct the flux to the left or against the direction of rotation. The useful section of iron in the armature core is only about one half of that in the field poles and as a consequence, the armature becomes so highly saturated that it is unable to carry sufficient flux to give a constant voltage condition on either half of the armature winding with a moderate circulating current, and therefore, this circulating current is apt to be uselessly large. By connecting the winding between brushes 10 and 11 and suitably arranging this winding on the pole or poles adjacent the shunt excited pole, two results are obtained. First, as this winding has an appreciable resistance, the condition illustrated in Fig. 9 is obtained, that is, the current circulating in the armature winding and tending to shift the flux to the left is reduced and, of course, its magnetizing value is reduced. Second, such circulating current as flows from brush 11 in the arrangement shown in Fig. 2, passes around the right hand south pole in a direction to strengthen this pole, with the result that the flux emanating from the north pole, magnetized by the shunt winding, is aided in a right hand direction. In the arrangement shown in Figs. 3 and 4, the effect is intensified as the current passes around the left hand south pole in a direction to make it a north pole, and therefore, by opposing the flux from the shunt wound north pole, the auxiliary winding more strongly tends to direct the flux to return to the right hand south pole. At the low speeds, therefore, while the electro-motive force developed across brushes 9 and 10 is greater than that developed across brushes 9 and 11, the armature current circulating between brushes 10 and 11, resulting from the preponderating effect of the right hand armature section, is of low value and on account of the decreased internal armature drop the effective voltage available for the external circuit across brushes 9 and 10 will be obtained at a lower speed of rotation than when the auxiliary windings are not used. This armature circulating current will, as previously explained, at a certain speed becomes zero, and at a still higher speed will reverse in direction. Immediately upon reversal, the magnetizing effect of the auxiliary coils will, of course, reverse, thus tending to make the right hand pole adjacent to the shunt excited pole a north pole and the left hand pole a stronger south pole.

In this modified arrangement, therefore, the terminal voltage effective across brushes 9 and 10, and therefore the effective current output for charging the battery, is controlled by controlling the value of the current circulating within the armature and the distribution of the flux due to the armature current. By modifying the auxiliary windings, the distribution and value of the armature flux may be varied and varying output characteristics obtained. The shape of the output curve depends entirely upon the magnetizing effect of the windings 19. With only a few turns of windings 19, an output as illustrated by curve A, Fig. 10, will be produced. Using a greater number of turns will produce the result that the current output will increase more rapidly at low speeds and materially decrease at higher speeds, as referred to above. The curve B will be obtained by increasing the number of turns of windings 19. Merely by changing the number of turns, any output curve between curve A and curve B or a curve more exaggerated than curve B may be obtained.

Figure 2:
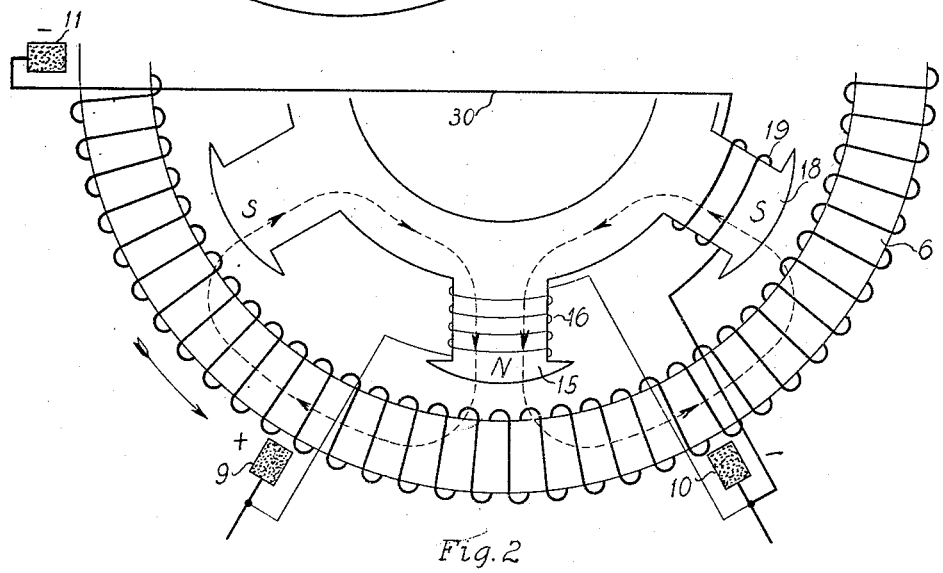
Fig. 2 is a simplified diagram of the active generator portion of the machine shown in Fig. 1.

The arrow in Fig. 2 indicates the direction of rotation of the armature 6, and the pole on the left of the exciting pole, which is in a direction against the direction of rotation, may be termed the "trailing pole," while the pole to the right of the exciting pole may be termed the "leading pole." The brush 11, therefore, is said to occupy a trailing position with reference to the trailing pole. Any pole of the machine may be selected as the exciting or generating pole, but it is preferable to employ the one on the bottom of the field yoke, or substantially on the bottom thereof, as by this selection the magnetic attraction tends to lift the armature and counteracts the effect of its weight on its bearings.

It is obvious that the principles herein described may be employed in other types of machines, and that by varying the relative number of turns, current characteristics may be obtained to meet various conditions of service. These and other changes may be made without departing from the invention as set forth in the appended claims.

What we claim as new and desire to secure by Letters Patent of the United States is:—

1. In a starting and lighting system for automobiles, a multipolar dynamo-electric machine adapted to operate as a motor or a generator, said machine having a ring wound armature, a plurality of positive and negative brushes equally spaced apart with respect to each other and to the poles of said machine, a storage battery, a starting switch for energizing the field and armature from said battery to operate said machine as a motor, said switch also disconnecting a plurality of said brushes whereby the current in said armature is concentrated in a restricted section thereof when the machine operates as a generator, and means for controlling the distribution of flux set up by the armature current in said restricted section.

2. In a starting and lighting system for automobiles, a multipolar dynamo-electric machine adapted to operate as a motor or a generator, said machine having a ring wound armature, a plurality of positive and negative brushes equally spaced with respect to each other and to the poles of said machine, a storage battery, a starting switch for energizing the field and armature from said battery to operate said machine as a motor, said switch also disconnecting a plurality of said brushes whereby the current in said armature is concentrated in a restricted section thereof when the machine operates as a generator, and means whereby the current circulating between certain of said brushes controls the distribution of flux set up in said restricted section by said armature current.

3. In a starting and lighting system for automobiles, a dynamo-electric machine adapted to operate as a starting motor, said machine also operating as a generator under predetermined conditions, a storage battery, a starting switch to connect the battery to the machine to operate the machine as a motor, said machine when operating as a generator having a field pole provided with a shunt winding, a leading pole and a trailing pole on either side of said energized pole, three brushes equally spaced apart, two of said brushes being arranged on opposite sides of said energized pole and the third brush being arranged in trailing relation to said trailing pole, said third brush being electrically connected to the more remote of said two first brushes, said electrical connection including a winding on one of said poles, and means for connecting said brushes to said battery under predetermined conditions.

4. A dynamo-electric machine provided with a field pole, an exciting coil thereon, a leading pole and a trailing pole adjacent to the exciting pole and symmetrically arranged on either side thereof, a ring wound armature, three brushes uniformly spaced, one pair of said three brushes coöperating with that part of the armature directly influenced by said field pole, another pair of said three brushes coöperating with that part of the armature directly influenced by said trailing pole, and an electrical connection between the outermost of said brushes, said electrical connection including field windings for controlling the distribution of flux in the armature.

5. In a starting and lighting system for automobiles, a dynamo-electric machine adapted to operate as a starting motor and as a generator, the armature of said machine being ring wound, said machine when operated as a generator having one field pole of one polarity and two poles of opposite polarity and having three brushes, one pair of said three brushes coöperating with that part of the armature directly influenced by said field pole and another pair of said three brushes coöperating with that part of the armature directly influenced by one of said two poles, and an electrical connection between the outermost brushes, said connection including field windings on said poles of like polarity.

6. In a variable speed generator, a ring wound armature, an energized field pole, two magnetic paths through the armature of said generator for the flux emanating from said pole and three brushes, a pair of said brushes embracing between them a section of the armature in which the total flux flows and a pair of said brushes embracing between them a section of the armature in which only a portion of said flux flows, one of said brushes being common to each pair, and an electrical connection between the brushes which are not common to said pairs, said connection including field windings for controlling the distribution of flux in said armature.

7. A dynamo-electric machine adapted to operate as a motor or as a generator, said machine having a field structure and a rotatable armature having a single winding, means for utilizing the entire armature and field structure when operating as a motor to obtain a motor of high torque, and means whereby only a portion of said armature winding is utilized when operating as a generator, said machine being provided with means to reduce the output of said portion as the speed increases.

8. A dynamo-electric machine adapted to operate as a motor or as a generator, said machine having a field structure and a rotatable armature having a single winding, means for utilizing the entire armature and field structure when operating as a motor to obtain a motor of high torque, and means whereby only a portion of the armature winding is utilized in generating, said field structure being provided with means to reduce the output of said portion of the armature as the speed increases.

9. A dynamo electric machine adapted to operate as a motor or as a generator, said machine having a field structure and a rotatable armature having a single winding, means for utilizing the entire armature and field structure when operating as a motor to obtain a motor of high torque, means whereby only a portion of the armature winding is utilized in generating, means for causing armature reaction to change the distribution of current through said portion of the armature, and field windings for aiding said last mentioned means.

10. A dynamo-electric machine adapted to operate as a motor and as a generator, said machine having an armature and a multi-polar field structure, a majority of the field poles during motoring being excited by coils connected in series with windings of said armature and a small proportion of the field poles being excited by shunt coils, means whereby the entire field structure and armature are active when the machine is operating as a motor, means whereby only a portion of the armature within the influence of said small proportion of the field poles is utilized when the machine operates as a generator, three equally spaced brushes placed to embrace said portion of the armature, and a conductor connecting two of said brushes through certain of said series connected field windings.

11. An automobile starting and lighting system including a dynamo-electric machine having a ring-wound armature, a plurality of field poles including a shunt wound pole, brushes corresponding in number to the field poles, connections whereby all of said brushes are active when the machine operates as a motor, connections whereby only a part of said brushes adjacent to the shunt excited pole are active when the machine operates as a generator, and means connecting certain of said last mentioned brushes through certain of said field poles for causing armature reaction to change the distribution of current in the part of the armature adjacent said last mentioned brushes.

12. In a starting and lighting system for automobiles, a dynamo-electric machine having a ring wound armature and adapted to operate as a starting motor, said machine being also adapted to operate as a generator under predetermined conditions, a storage battery, a starting switch to connect the battery to the machine to operate the machine as a motor, said switch also disconnecting part of the turns of said armature when the machine operates as a generator, said machine being provided with means including certain of the field windings of said machine for causing a change in the distribution of current in the remaining electrical circuits to limit the active field flux of said machine.

13. In a starting and lighting system for automobiles, a dynamo-electric machine adapted to operate as the starting motor, said machine also operating as a generator under pre-determined conditions, a storage battery, a starting switch to connect the battery to the machine to operate the machine as a motor, said machine when operating as a generator having a field pole provided with a shunt winding, a leading pole and a trailing pole on either side of said energized pole, three brushes equally spaced apart, two of said brushes being arranged on opposite sides of said energized pole, and the third brush being arranged in trailing relation to said trailing pole, said third brush being electrically connected to the more remote of said two first brushes through a circuit including a field winding, and means for connecting said brushes to said battery under predetermined conditions.

14. A dynamo-electric machine provided with a field pole, an exciting coil thereon, a wound leading pole and a training pole adjacent to the excited pole and symmetrically arranged on either side thereof, a ring wound armature coöperating with said poles, three brushes uniformly spaced, one located between the leading pole and the excited pole, a second located between the excited pole and the trailing pole, and the third in a trailing position with reference to the trailing pole, and an electrical connection between the first and third brushes, said connection including the winding of said leading pole.

15. A dynamo-electric machine provided with a field pole, an exciting coil thereon, a wound leading pole and a wound trailing pole adjacent to the excited pole and symmetrically arranged on either side thereof, a ring wound armature coöperating with said poles, three brushes uniformly spaced, one located between the leading pole and the excited pole, a second located between the excited pole and the trailing pole, and the third in a trailing position with reference to the trailing pole, and an electrical connection between the first and third brushes, said connection including the windings of said leading and trailing poles.

16. An automobile starting and lighting system including a dynamo-electric machine having a ring wound armature, a plurality of field poles including a shunt wound pole, brushes corresponding in number to the field poles, connections whereby all of said brushes are active when the machine operates as a motor, connections whereby only a few of said brushes adjacent the shunt excited pole are active when the machine acts as a generator, and means connecting certain of said few brushes and including the windings of certain of said field poles for affecting the distribution of current in the portion of the armature embraced between the active brushes in generating whereby the output of the generator is controlled.

17. In a starting and lighting system for automobiles, a dynamo-electric machine adapted to operate as a starting motor and as a generator, the armature of said machine being ring-wound, said machine when operating as a generator having one field pole of one polarity and two poles of opposite polarity and having three brushes, a brush being arranged between the first pole and each of the other poles and the third brush being arranged on the opposite side of one of said second poles, and an electrical connection between said last mentioned brush and the brush on the opposite side of said first pole, said connection including certain of the windings of said poles of opposite polarity.

18. In a variable speed generator, an energized field pole, a ring wound armature providing two paths for the flux emanating from said pole and three brushes, a pair of said brushes embracing between them a section of the armature in which the total flux flows and a pair of said brushes embracing between them a section of the armature in which only a portion of said flux flows, one of said brushes being common to each pair, and an electrical connection between the brushes which are not common to said pairs, said connection including means for distorting the flux in that part of the armature embraced between said last mentioned brushes.

19. A dynamo-electric machine adapted to operate as a motor or as a generator, said machine when acting as a motor employing the entire field and armature structures to produce a motor of high torque, means for confining the generating portion of the armature to a relatively small portion thereof when the machine acts as a generator, and field windings for supplementing the effects of armature reaction in the active portion of said armature.

20. A single unit automobile starter and lighter including a dynamo-electric machine having a ring wound armature and a field structure including a plurality of series excited poles and a shunt excited pole, means for utilizing only a relatively small portion of the armature adjacent the shunt excited pole in generating, and connections causing a relatively great armature reaction in said active portion of the armature to assist the flux from said shunt excited pole under certain conditions of operation and to oppose said flux under other conditions of operation, whereby the output of the generator is limited, said connections including field windings for supplementing the effects of armature reaction.

21. A dynamo having a ring wound armature, a coöperating field pole provided with a shunt field winding and a pair of field poles on opposite sides of said first mentioned pole adapted to become consequent poles and embracing a relatively small part of said ring wound armature, said last mentioned poles being provided with windings for supplementing the effects of armature reaction to vary the distribution of flux through said consequent poles.

22. A multipolar dynamo-electric machine having a ring wound armature and being adapted to operate as a motor and also as a generator, one of its poles being provided with a shunt winding, the other poles being provided with series windings, the two poles adjacent to the shunt wound pole being adapted to become consequent poles under generating conditions, said two poles embracing a relatively small part of said ring wound armature, certain of the windings of said adjacent poles constituting means for supplementing the effects of armature reaction for affecting the distortion of the flux through said consequent poles.

23. A multipolar dynamo electric machine adapted to operate as a motor and also as a generator, said machine being provided with an armature and field poles, one of said poles being provided with a shunt field winding, the two adjacent poles being adapted to become magnetized from said first mentioned pole and said armature under generating conditions, whereby opposing E. M. F.'s are set up in said armature, a pair of brushes coöperating with said armature, said brushes being connected by a conductor to supply one generator lead, said brushes being located to embrace the armature conductors directly influenced by said shunt wound pole and one of said adjacent poles, and a third brush placed between said first named brushes to supply the other generator lead, said conductor including means for distorting the flux due to said shunt wound pole.

24. A multipolar-dynamo-electric machine adapted to operate as a motor and also as a generator, said machine being provided with an armature and field poles, one of said poles being provided with a shunt field winding, the two adjacent poles being adapted to become magnetized from said first mentioned pole and said armature under generating conditions, whereby opposing E. M. F.'s are set up in said armature, a pair of brushes coöperating with said armature, said brushes being connected by a conductor to supply one generator lead, said brushes being located to embrace the armature conductors directly influenced by said shunt wound pole and one of said adjacent poles, and a third brush placed between said first named brushes to supply the other generator lead, said conductor including field windings of certain of said field poles.

25. A multipolar dynamo-electric machine having a shunt winding on one pole and series windings on the other poles, whereby the machine will develop a high torque as a motor, the shunt wound pole being adapted to render the two adjacent poles consequent poles, a ring wound armature associated with said poles whereby said shunt wound pole and one of said consequent poles will set up opposing E. M. F.'s in the armature coils directly associated therewith, brushes embracing said coils, a conductor connecting said brushes and adapted to supply a generator lead, and a third brush intermediate the first two brushes, adapted to supply the other generator lead, said conductor including certain of said series windings.

26. A dynamo-electric machine having a shunt wound pole and a pair of poles arranged on opposite sides thereof and adapted to be magnetized therefrom, whereby to become consequent poles, a ring wound armature, brushes coöperating with said armature embracing a part of said armature under the influence of said shunt wound pole and one of said consequent poles, said brushes being connected by a conductor, a third brush placed intermediate of the other two brushes, said conductor including field windings on said pair of poles for supplementing armature reaction in affecting the distribution of flux through said poles.

27. A multipolar-dynamo electric machine adapted to operate as a motor or a generator, said machine having a shunt wound pole and a pair of adjacent poles adapted to be influenced by said shunt wound pole to become consequent poles, an armature associated with said poles whereby armature current will set up a flux to vary the distribution of flux through said consequent poles and also to affect the flux through said shunt wound pole for the purpose specified, said machine being provided with a circuit including two brushes embracing the part of said armature directly influenced by said shunt wound pole and one of said consequent poles, and windings for supplementing the varying effect of the armature current.

In witness whereof, we have hereunto subscribed our names.

WILLIAM A. TURBAYNE.
THOMAS R. DU BOIS.